(12) United States Patent
Kim et al.

(10) Patent No.: US 7,263,204 B2
(45) Date of Patent: Aug. 28, 2007

(54) BLIND WATERMARKING METHOD BY GROUPING CODEWORDS FOR VQ-QUANTIZED IMAGES

(75) Inventors: Hyoung Do Kim, Sungnam (KR); Byeong Hee Roh, Seoul (KR)

(73) Assignee: Ajou University Industry Cooperation Foundation (KR)

( * ) Notice: Subject to any disclaimer, the term of this patent is extended or adjusted under 35 U.S.C. 154(b) by 828 days.

(21) Appl. No.: 10/436,014

(22) Filed: May 12, 2003

(65) Prior Publication Data

US 2004/0032967 A1    Feb. 19, 2004

(30) Foreign Application Priority Data

Aug. 14, 2002    (KR) ..................... 10-2002-0048067

(51) Int. Cl.
*G06K 9/00* (2006.01)
(52) U.S. Cl. ..................... 382/100; 382/232; 382/253
(58) Field of Classification Search ............. 382/100, 382/232, 253; 380/54, 287, 252; 713/176
See application file for complete search history.

(56) References Cited

U.S. PATENT DOCUMENTS

| | | | | | |
|---|---|---|---|---|---|
| 4,644,528 | A | * | 2/1987 | Ahmad et al. | 370/378 |
| 7,006,659 | B2 | * | 2/2006 | Kim et al. | 382/100 |
| 2004/0019877 | A1 | * | 1/2004 | Berkowitz et al. | 717/117 |

* cited by examiner

*Primary Examiner*—Joseph Mancuso
*Assistant Examiner*—Clarie Wang
(74) *Attorney, Agent, or Firm*—Ober/Kaler; Royal W. Craig (57) ABSTRACT

A blind watermarking method by grouping codewords for VQ-quantized images is disclosed. Especially there is provided a watermark insertion method in which a codebook is divided into three groups satisfying specific standards and a codeword is allocated based on the group to which the corresponding codeword belongs to insert watermark information, and a watermark extraction method for extracting the watermark inserted by the watermark insertion method. According to the present invention, watermark information can be uniformly inserted into an input vector space and the original image is not needed for extracting the watermark information.

12 Claims, 8 Drawing Sheets

(a) Source image vectors  (b) Allocation according to vector quantization  (c) Watermark insertion $G_{-1} = \{c_1, c_8\}, G_0 = \{c_0, c_3, c_7, c_9, c_{11}\}, G_1 = \{c_2, c_4, c_5, c_6, c_{10}\}$
$Alt(c_0)=c_2, Alt(c_3)=c_4, Alt(c_7)=c_5, Alt(c_9)=c_6, Alt(c_{11})=c_{10},$
$Alt(c_2)=c_0, Alt(c_4)=c_3, Alt(c_5)=c_7, Alt(c_6)=c_9, Alt(c_{10})=c_{11}$

BLIND WATERMARKING METHOD BY GROUPING CODEWORDS FOR VQ-QUANTIZED IMAGES

BACKGROUND OF THE INVENTION

1. Field of the Invention

The present invention relates to a blind watermarking method by grouping codewords for VQ-quantized images and, more specifically, to a watermark insertion method in which a codebook is divided into three groups satisfying specific standards and a codeword is allocated based on the group to which the corresponding codeword belongs so as to insert watermark information, and a watermark extraction method for extracting the watermark inserted by the watermark insertion method.

2. Background of the Related Art

A watermarking technique that inserts data into digital contents to protect the copyright thereof is being studied and developed in various ways according to the kind of digital media (image, audio, video, 2D/3D graphic, etc.), compression/decompression methods (DCT [Cox 1997], DFT [Ruanaidh 1996], DWT [Niu 2000], VQ [Lu 2000] and so on), and utilizing methods (visible/invisible, durable/destructive, open/not-open to the public, etc.).

In the meantime, a vector quantization (VQ) technique is an approximation solution frequently used for image compression and consists of three-step processes. Specifically, the first step (learning stage) generates a codebook ($c_0$, $c_1$, ..., $c_{N-1}$) consisting of N vectors from a set of input vectors for learning. The second step (compression step) represents a source image X to be compressed as T vectors ($x_0$, $x_1$, ..., $x_{T-1}$). In addition, for each input vector $x_t (0 \leq t \leq T-1)$, the second step finds out a codeword $c_i$ that is the most similar to the input vector from the codebook and allocates i instead of $x_t$. The third step (decompression step) extracts $c_i$ corresponding to i from the codebook to use it in place of $x_t$.

An example of compression/decompression of an image using a codebook composed of eight codewords ($c_0$, ..., $c_7$) will be explained with reference to FIG. 1.

Figure 1:
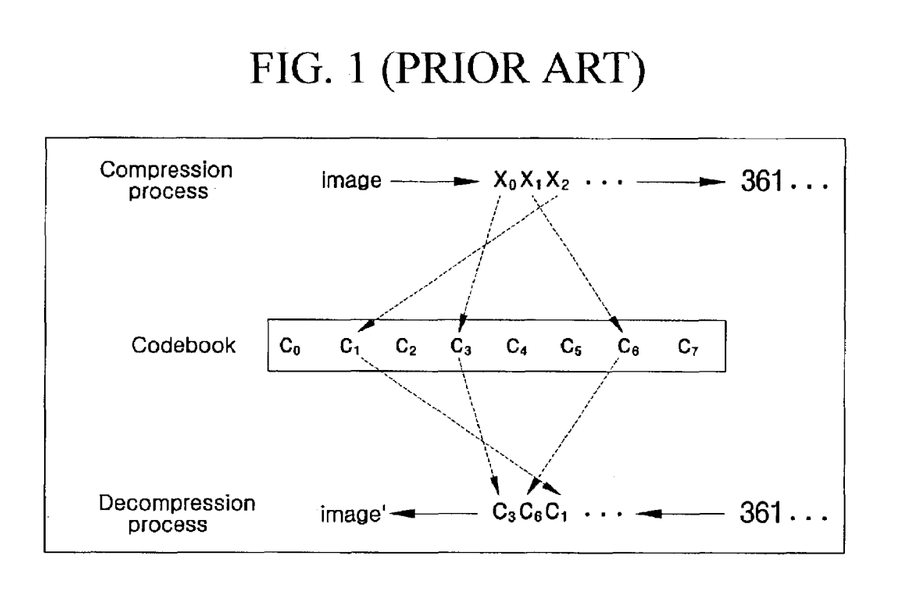
FIG. 1 is a diagrammatic view illustrating compression/decompression processes in vector quantization.

FIG. 1 is a diagrammatic view illustrating compression/decompression processes in vector quantization.

Referring to FIG. 1, at the compression step, first, the image to be compressed is decomposed into vectors of the same dimension as the codewords, the vectors ($x_0$, $x_1$, $x_2$, ...) are compared with the codewords to select the codeword closest to each vector, and the position of the closest codeword is used in the compressed image. That is, codewords $c_3$, $c_1$ and $c_6$ are judged to be the closest to $x_0$, $x_1$ and $x_2$, respectively, and 3, 6 and 1 representing the positions of the closest codewords are used in the compressed image. At the decompression step, codewords are extracted from the codebook with the position values of the codewords, stored in the compressed image, to generate a restoration image similar to the original image. As described above, the vector quantization enables efficient compression and rapidly restores images.

While the vector quantization technique is the approximation solution frequently used for image compression, a watermarking technique based on vector quantization has not being sufficiently studied, compared with the fruitful result of the watermarking technique in a spatial area or conversion area.

The VQ-based watermarking technique proposed by Lu and Sun in 2000 classifies similar codewords contained in a codebook to form multiple groups (group size is 2n where n=0, 1, ...) and confirms the codeword that is the most similar to each input image vector and the group including this codeword. The number of bits of watermark capable of being inserted is determined according to the set group size 2n.

Figure 2:
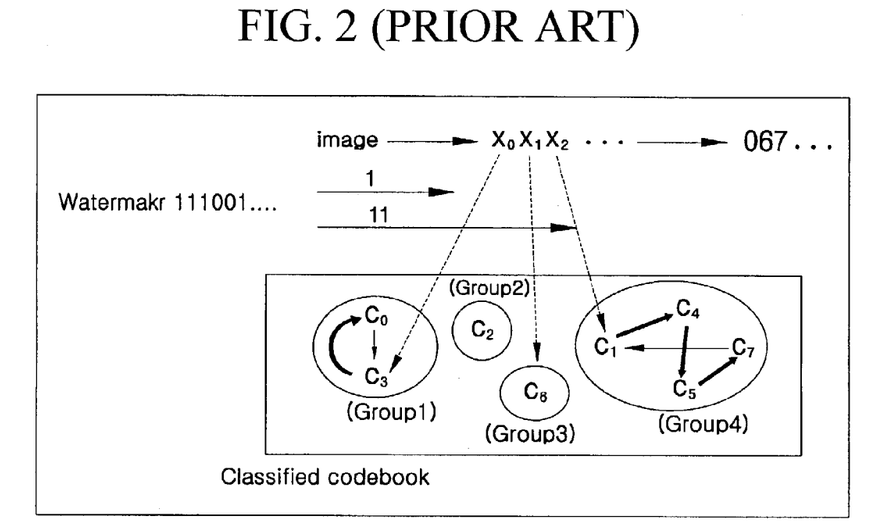
FIG. 2 is a diagrammatic view illustrating a conventional watermark insertion processing using classified codewords.

An example using the VQ-based watermarking technique proposed by Lu and Sun will be described with reference to FIG. 2. In this example, eight codewords are classified into four groups $\{c_0,c_3\}$, $\{c_2\}$, $\{c_6\}$ and $\{c_1,c_4,c_5,c_7\}$.

$c_3$ that is the most similar to the input vector $x_0$ is included in the first group. A 1-bit watermark can be inserted into the first group because this group includes two codewords. That is, the codewords are used without any change when the watermark bit value is 0 but they are replaced by other codewords when the bit value is 1. Because the bit value to be inserted is 1, $c_0$ can be used instead of $c_3$. Though the input vector $x_1$ is the most similar to $c_6$, the third group includes only this codeword so that watermark cannot be inserted into this group.

Since the fourth group includes four codewords, a 2-bit watermark can be inserted into this group. In case of the input vector $x_2$, $c_1$ is replaced by $c_7$ in order to insert the 2-bit watermark (11) into the fourth group. In the extraction process, 3 that is the group's inner distance between $c_1$ and $c_7$ is represented in bits so as to extract watermark information.

The above-described VQ-based watermarking technique by Lu and Sun maximizes the quantity of information of watermark inserted. However, this technique has the problem in that the quantity of lost watermark information is increased or loss of watermark information may be concentrated on one spot when a compressed image is damaged because the quantity of information inserted by input vectors is intensively varied. Furthermore, it is difficult to use the technique since the extraction process indispensably requires the original image.

SUMMARY OF THE INVENTION

Accordingly, the present invention has been made in view of the above problems, and it is an object of the present invention to provide a blind watermarking method that is capable of uniformly inserting watermark information into an input vector space and does not require the original image in the extraction process.

To accomplish the above object, according to an aspect of the present invention, there is provided a method for inserting watermark information $B(b_0,b_1, \ldots, b_{W-1}, b_w \in \{0,1\}, 0 \leq w \leq W-1)$ for each input vector $x_t (0 \leq t \leq T-1)$ of a vector-quantized source image using codeword grouping. The method comprises a step 1-1 of generating three groups $G_{-1}$, $G_0$ and $G_1$ that satisfy relationships $C = G_{-1} \cup G_0 \cup G_1$ and $G_{-1} \cap G_0 = G_0 \cap G_1 = G_{-1} \cap G_1 = \phi$ and a condition that a codeword $c_j$ corresponding to a codeword $c_i$ belonging to the group $G_0$ (or $G_1$) must belong to the group $G_1$ (or $G_0$), for the whole set C of codewords constructing a codebook; a step 1-2 of initializing variables t and w to be processed; a step 1-3 of selecting one bit $b_w$ of the watermark information B; a step 1-4 of selecting a codeword $c_i$ that is the closest to $x_t$ from the codebook; a step 1-5 of judging a group $G_P$ including the selected $c_i$, increasing t by 1 when P is −1, and returning to the step 1-4; a step 1-6 of allocating the codeword $c_i$ without any change when the integer value of the current watermark bit $b_w$ is identical to P and allocating the codeword $c_j$ corresponding to $c_i$ when it is not identical to P, in the case where P is judged to be 0 or 1 from the judgement of the group $G_P$ including the selected $c_i$; and a step 1-7 of finishing processing of the watermark when the watermark information B has been completely processed, and respectively incrementing the variables w and t by 1 when it has not been completely processed and then returning to the step 1-3.

To accomplish the object of the present invention, there is also provided a watermark extraction method using codeword grouping, comprising a step 2-1 of initializing a variable n; a step 2-2 of extracting a codeword $c_n$ from an image block into which watermark information has been inserted; a step 2-3 of confirming the group $G_P$ including the extracted codeword $c_n$, ignoring the codeword $c_n$ when P is −1, and changing the codeword $c_n$ into a bit value to add it to the extracted watermark information when P is 0 or 1; and a step 2-4 of incrementing the variable n by 1 until extraction of the watermark is finished and repeating the steps 2-2 and 2-3.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and advantages of the present invention will be apparent from the following detailed description of the preferred embodiments of the invention in conjunction with the accompanying drawing, in which.

DETAILED DESCRIPTION OF THE INVENTION

Reference will now be made in detail to the preferred embodiments of the present invention, examples of which are illustrated in the accompanying drawings.

A method of inserting watermark information $B(b_0, b_1, \ldots, b_{W-1}, b_w \in \{0,1\}, 0 \le w \le W-1)$ for each input vector $x_t (0 \le t \le T-1)$ of a vector-quantized source image will be explained in detail with reference to FIG. 3.

Figure 3:
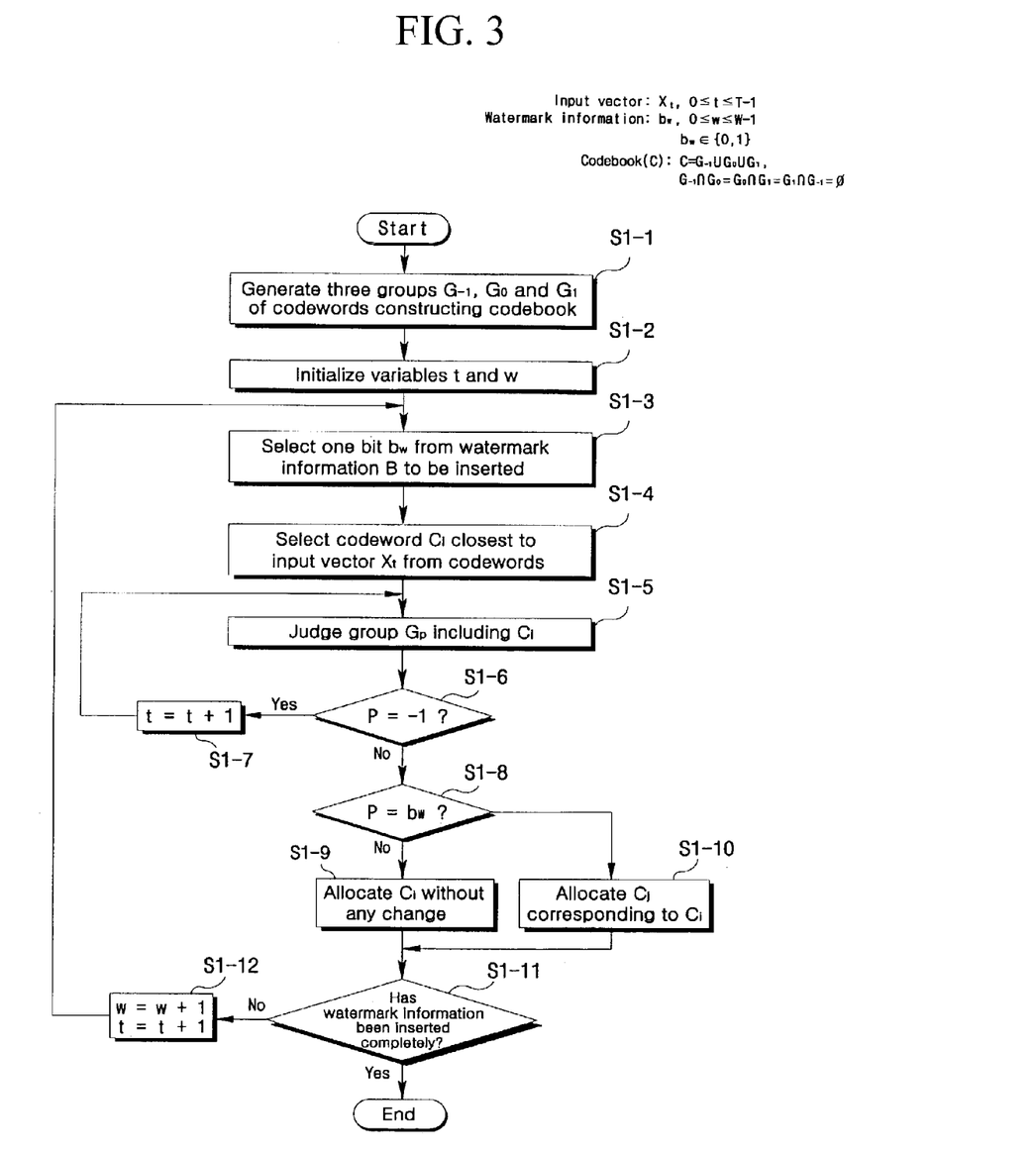
FIG. 3 is a flow chart showing a watermark insertion process according to an embodiment of the present invention.

FIG. 3 is a flow chart showing a watermark insertion process according to an embodiment of the present invention.

In a preferred embodiment of the present invention, three groups $G_{-1}$, $G_0$ and $G_1$ are generated from codewords constructing a codebook at step S1-1. Here, Each codeword belonging to the codebook must be included in only one of the three groups $G_{-1}$, $G_0$ and $G_1$. That is, the whole set C of the codewords constructing the codebook must satisfy the following expressions 1 and 2.

$$C = G_{-1} \cup G_0 \cup G_1 \quad \text{[Expression 1]}$$

$$G_{-1} \cap G_0 = G_0 \cap G_1 = G_{-1} \cap G_1 = \phi \quad \text{[Expression 2]}$$

Here, it means that the codewords belonging to the group $G_0$ or $G_1$ include the watermark bit 0 or 1 and the codewords belonging to the group $G_{-1}$ does not or cannot include any watermark information. The codewords belonging to the group $G_0$ or $G_1$ must have codewords corresponding thereto in the group $G_1$ or $G_0$, which can be represented by the following expression 3.

$$\text{Alt}[c_i] = c_j, c_i \in G_o \text{ and } c_j \in G_1 \text{ or } c_i \in G_1 \text{ and } c_j \in G_o \quad \text{[Expression 3]}$$

For a specific value D (D>0), the square of Euclidean distortion between $c_i$ and $c_j$, SED $(c_i, c_j)$, must be smaller than D. However, the codewords belonging to the group $G_{-1}$ are distant from all the codewords belonging to the codebook except themselves by more than D. Here, 'D' is a real number meaning a distance between vectors.

Now, the codewords with respect to each input vector $x_t$ are reallocated using the three groups generated at the step S1-1 so as to insert the watermark. Specifically, variables to be processed are initialized first. For example, variables t and w that represent the input vector and the sequence of the watermark bit, respectively, are set to 0 at step S1-2.

Then, the $w^{th}$ bit $b_w$ to be currently processed is selected from the watermark information B at step S1-3. Subsequently, the codeword $c_i$ that is the closest to the input vector $x_t$ to be currently processed is selected from the codebook at step S1-4.

The group $G_P$ including the selected codeword $c_i$ is judged at step S1-5. The variable t is incremented by 1 when P is −1 through steps S1-6 and S1-7 and the procedure returns to the step S1-4. The procedure returns to the step S1-4 when P=−1 because the watermark bit $b_w$ cannot be inserted in that case.

In the case where P is 0 or 1 when the group $G_P$ including the selected codeword $c_i$ is judged, however, the watermark bit is inserted. That is, $c_i$ is allocated without any change when the integer value of the current watermark bit $b_w$ is identical to P while $c_j$ corresponding to $c_i$ is allocated when it is not identical to P through steps S1-8, S1-9 and S1-10.

Through the step S1-6, 1-bit watermark information is inserted. It is judged if the current watermark information B has been completely processed at step S1-11, and the insertion procedure is finished when it has been completely processed. When watermark information to be processed is left (step S1-12), however, the insertion procedure should be continued so that the variables w and t are respectively incremented by 1 and then the procedure returns to the step S1-3. Here, the step S1-1 is carried out only once for the codewords generated using input vectors for learning and the steps following the step S1-2 can be repeated for many images.

An example of inserting a watermark bit stream "01110100101001" into a source image composed of sixteen vectors will be explained with reference to FIG. 4.

Figure 4:
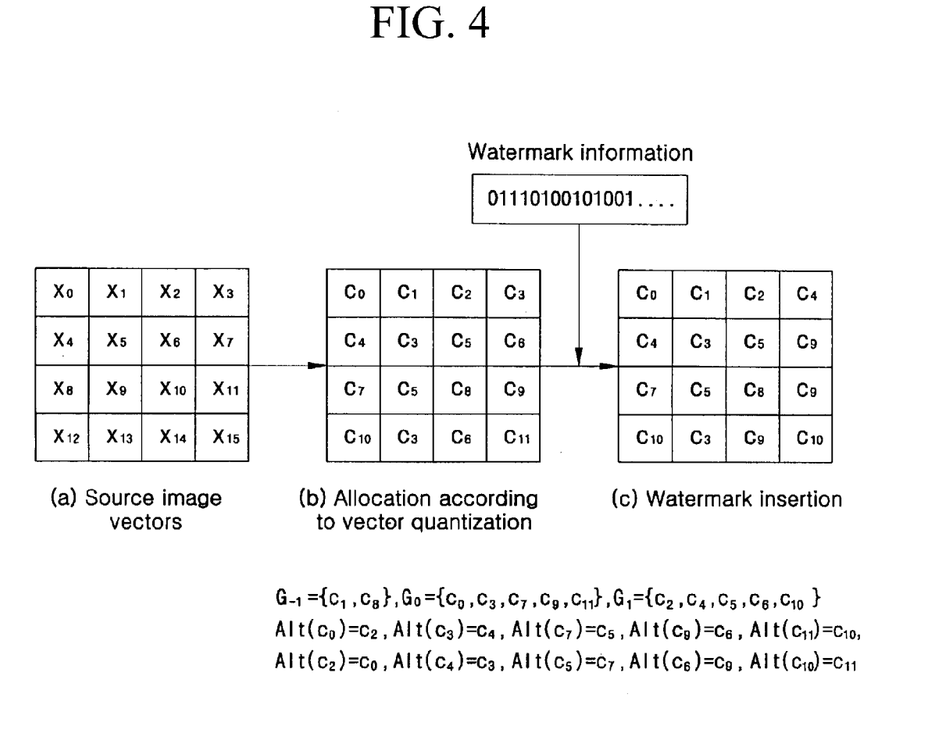
FIG. 4 is a diagrammatic view illustrating allocation of codewords according to inserted watermark information.

Referring to FIG. 4, because codewords $c_1$ and $c_8$ belong to the group $G_{-1}$, they are not used for insertion of the watermark. Four codewords are replaced with other codewords which match with them in the insertion procedure.

For example, though $c_3$ is initially allocated to $x_3$, it is replaced by $c_4$(Alt($c_3$)) because the bit to be inserted is 1 and it belongs to $G_0$.

In order to insert the watermark bit according to the aforementioned process, three groups $G_{-1}$, $G_0$ and $G_1$ satisfying a specific condition must be generated from the whole set of codewords constructing the codebook, as described above at the step S1-1.

A preferred embodiment of dividing a codebook composed of m codewords into three groups will be explained with reference to FIG. 5.

Figure 5:
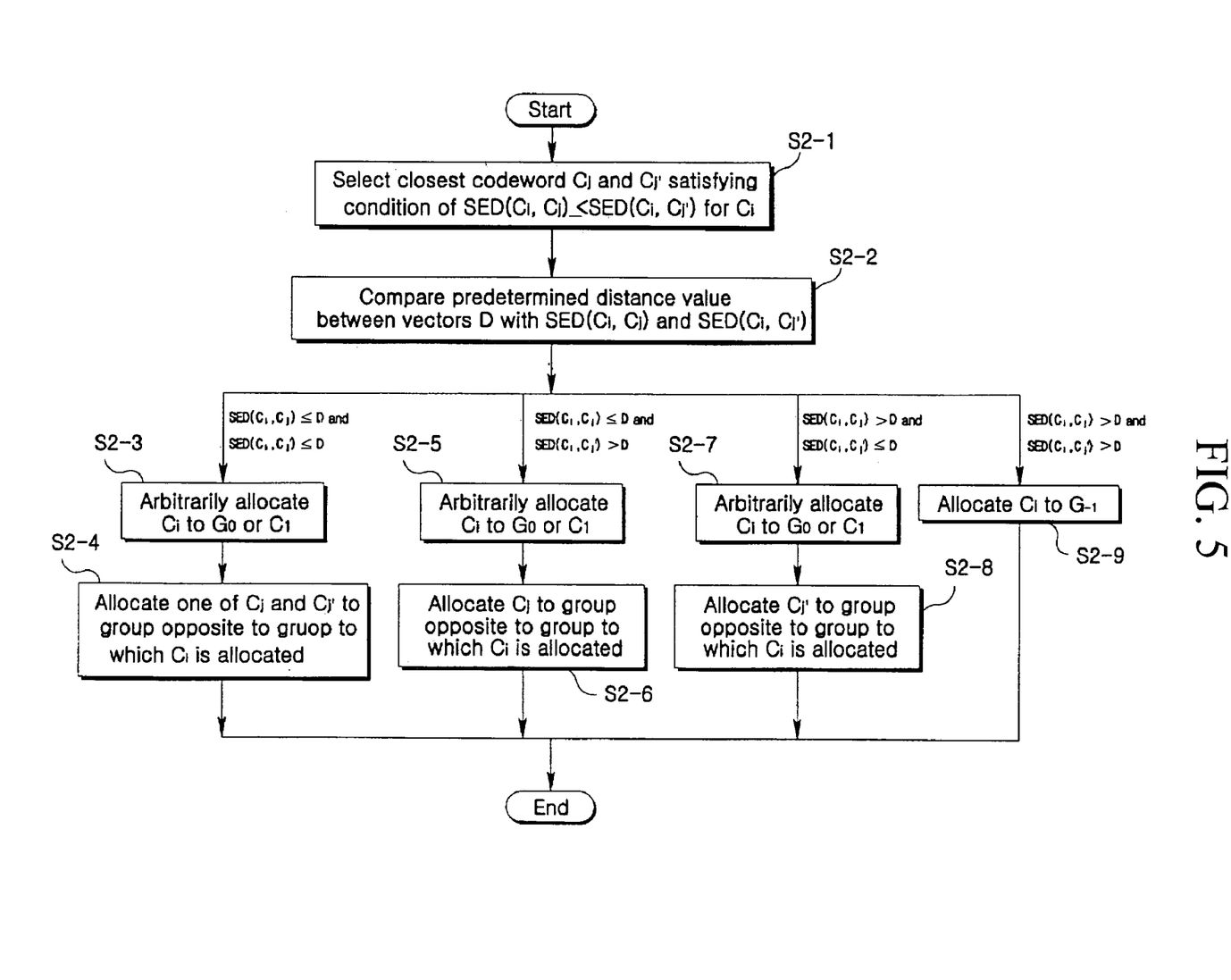
FIG. 5 is a flow chart showing a process of dividing a codebook into three groups.

FIG. 5 is a flow chart showing a process of dividing a codebook into three groups.

Referring to FIG. 5, first of all, for each of the codewords $c_i$ constructing the codebook, two closest codewords $c_j$ and $c_{j'}$ satisfying the condition of SED($c_i,c_j$)≦SED($c_i,c_{j'}$) are selected at step S2-1. Here, SED(x,y) means the square of Euclidean distortion between x and y and corresponds to a distance between vectors.

Then, the predetermined distance value between vectors, D, is compared with the calculated SED($c_i,c_j$) and SED($c_i,c_{j'}$) at step S2-2. Here, 'D' means a distance between vectors, set by a user, and the degree of distortion of an image and the size of watermark information are determined according to the value D.

According to the compared result at the step S2-2, codewords are allocated as follows.

(1) When both of SED($c_i,c_j$) and SED($c_i,c_{j'}$) are less than D, $c_i$ is arbitrarily allocated to $G_0$ or $G_1$ at step S2-3 and one of $c_j$ and $c_{j'}$ is arbitrarily selected to be allocated to the opposite group $G_1$ or $G_0$ at step S2-4.

(2) When SED($c_i,c_j$)≦D and SED($c_i,c_{j'}$)>D, $c_i$ is arbitrarily allocated to $G_0$ or $G_1$ at step S2-5 and $c_j$ is selected to be allocated to the opposite group $G_1$ or $G_0$ at step S2-6.

(3) When SED($c_i,c_j$)>=D and SED($c_i,c_{j'}$)<D, $c_i$ is arbitrarily allocated to $G_0$ or $G_1$ at step S2-7 and $c_{j'}$ is selected to be allocated to the opposite group $G_1$ or $G_0$ at step S2-8.

(4) When both of SED($c_i,c_j$) and SED($c_i,c_{j'}$) are more than D, $c_i$ is allocated to $G_{-1}$ at step S2-9.

This allocation is applied to the codebook composed of a specific number (m) of codewords. It is preferable to minimize the number of codes belonging to the group $G_{-1}$ in order to insert a larger amount of watermark information. That is, when the codebook is divided into three groups, it is important that most codewords have codewords corresponding to themselves in other groups. Furthermore, it is important to precisely design the codebook and division method because the source image, codebook and division method determine the number of bits to be inserted.

A preferred embodiment of generating a codebook having m codewords will be explained with reference to FIG. 6.

Figure 6:
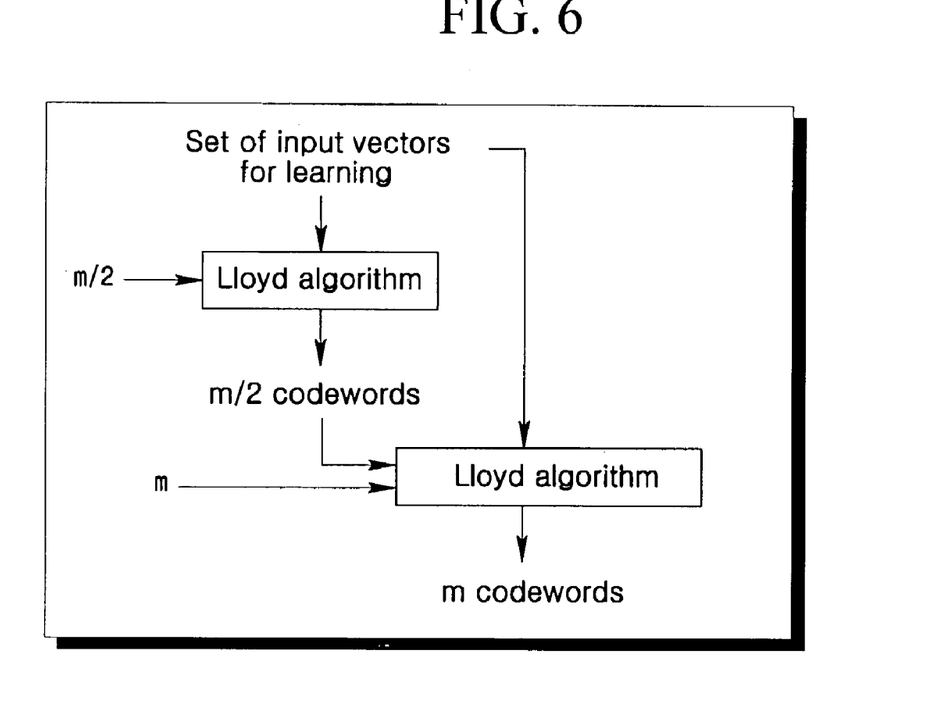
FIG. 6 is a flow chart showing an embodiment of generating a codebook.

FIG. 6 is a flow chart showing an embodiment of generating a codebook;

Referring to FIG. 6, Lloyd algorithm is applied to a set of input vectors for learning to generate a codebook having m/2 codewords. The generated codebook is set to the initial value of Lloyd algorithm, and Lloyd algorithm is applied to the set of the input vectors for learning again to finally generate the codebook composed of m codewords. Lloyd algorithm that generates codewords from a specific initial value and input vectors is well-known in the art so that detailed explanation therefor is omitted.

There is also needed a method for effectively extracting the inserted watermark. A preferred embodiment of extracting a watermark from a vector-quantized image into which watermark information has been inserted will be explained with reference to FIG. 7.

Figure 7:
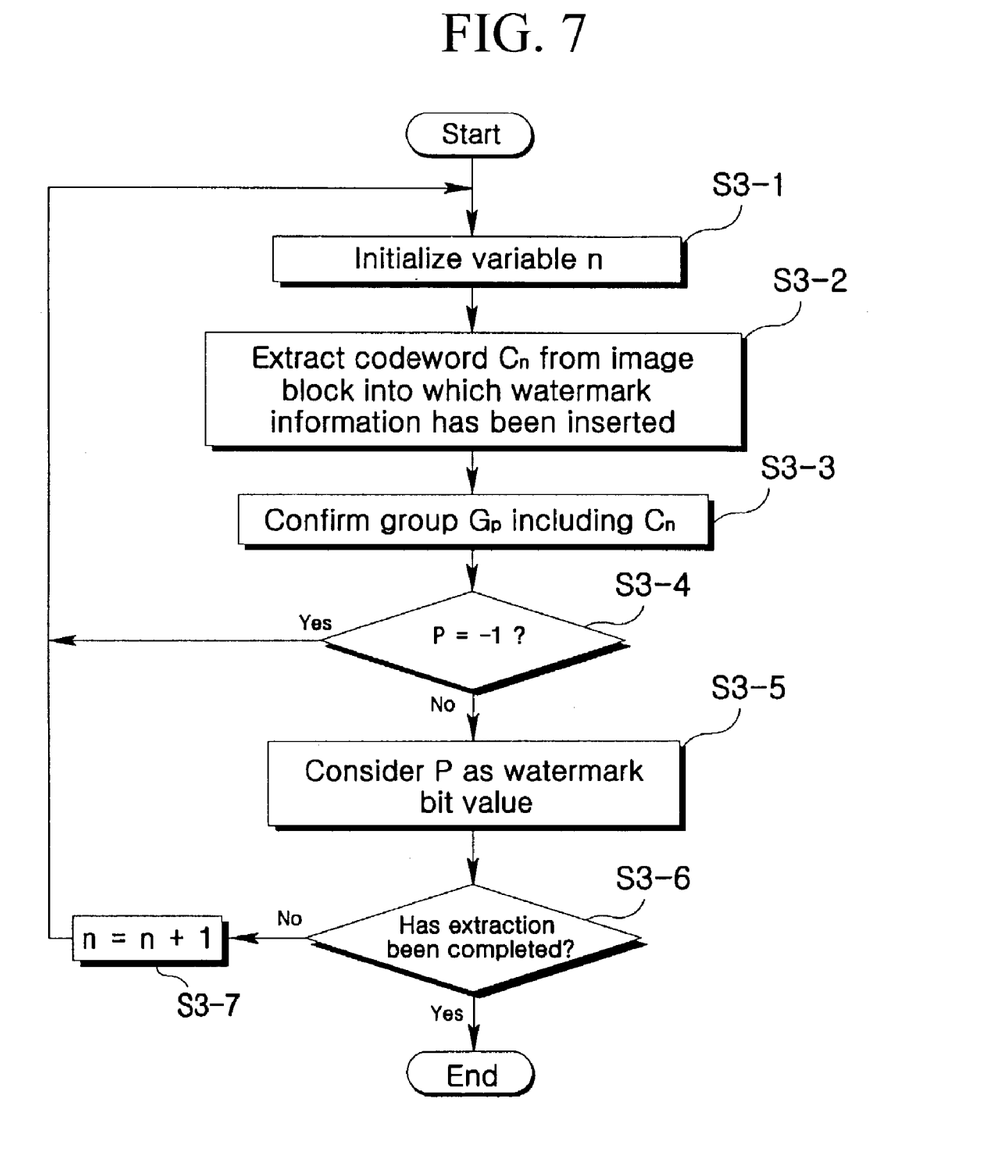
FIG. 7 is a flow chart showing a watermark extraction process according to an embodiment of the present invention.

FIG. 7 is a flow chart showing a watermark extraction process according to an embodiment of the present invention.

Referring to FIG. 7, first of all, a variable n is initialized in order to continuously extract watermark bits at step S3-1. A codeword $c_n$ is extracted from an image block having watermark information inserted thereinto at step S3-2. The group $G_P$ including the extracted codeword $c_n$ is confirmed at step S3-3. The codeword $c_n$ is ignored when P is −1 whereas it is changed into a bit value and added to the extracted watermark information when P is 0 or 1 through steps S3-4 and S3-5. The variable n is incremented by 1 until the extraction of watermark is finished and the steps S2-2 and S2-3 are repeated through steps S3-6 and S3-7.

Figure 8:
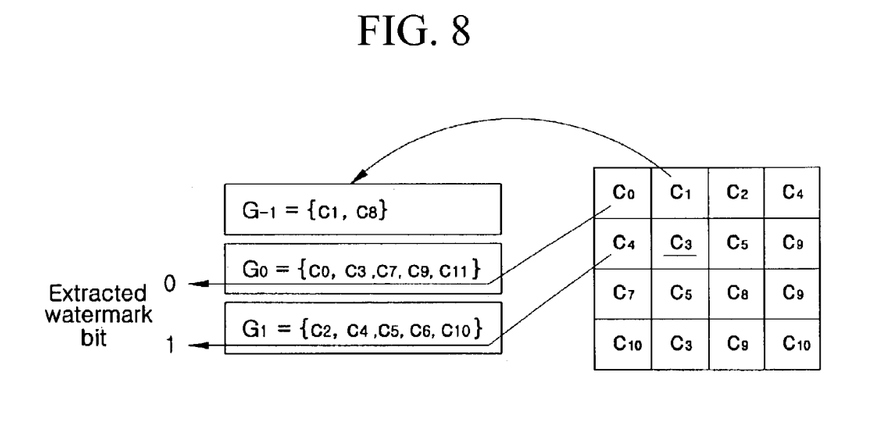
FIG. 8 is a diagrammatic view illustrating extraction of a watermark from codewords.

That is, the watermark can be extracted by confirming the group $G_P$ including $c_n$ and confirming P. Referring to FIG. 8, codewords $c_1$ and $c_8$ do not include watermark information because they belong to the group $G_{-1}$. However, $c_0$ represents the watermark bit '0' since it belongs to the group $G_0$ and $c_4$ represents the watermark bit '1' because it belongs to the group $G_1$.

While the steps of each of the aforementioned embodiments can be executed through hardware or software, they can be preferably carried out according to a computer program installed in a computer system. Accordingly, the present invention includes a recording medium capable of being read with the computer storing the computer program for executing each of the steps. This computer program can be programmed using various computer programming languages.

As described above, according to the present invention, watermark information can be uniformly inserted into an input vector space and the original image is not needed for extracting the watermark information. Especially, loss of watermark information, caused by damage to images during a transmission process, can be minimized by increasing probability of inserting one watermark bit into each input vector. Furthermore, the watermarking method of the invention can be conveniently applied and it is robust against attacks according to vector quantization compression or JPEC compression.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for inserting watermark information B($b_0$, $b_1$, ..., $b_{w-1}$, $b_w$ ∈ {0,1}, 0≦w≦W−1) for each input vector $x_t$(0≦t≦T−1) of a vector-quantized source image using codeword grouping, the method comprising:

a step 1-1 of generating three groups $G_{-1}$, $G_0$ and $G_1$ that satisfy relationships $C = G_{-1} \cup G_0 \cup G_1$ and $G_{-1} \cap G_0 = G_0 \cap G_1 = G_{-1} \cap G_1 = \phi$ and a condition that a codeword $c_j$ corresponding to a codeword $c_i$ belonging to the group $G_0$ or $G_1$, must belong to the group $G_1$ or $G_0$, for the whole set C of codewords constructing a codebook;

a step 1-2 of initializing variables t and w to be processed;

a step 1-3 of selecting one bit $b_w$ of the watermark information B;

a step 1-4 of selecting a codeword $c_t$ that is the closest to $x_t$ from the codebook;

a step 1-5 of judging a group $G_p$ including the selected $c_i$, incrementing t by 1 when P is −1, and returning to the step 1-4;

a step 1-6 of allocating the codeword $c_i$ without any change when the integer value of the current watermark bit $b_w$ is identical to P and allocating the codeword $c_j$ corresponding to $c_i$ when it is not identical to P, in the case where P is judged to be 0 or 1 from the judgment of the group $G_p$ including the selected $c_i$; and a step 1-7 of finishing processing of the watermark when the watermark information B has been completely processed, and respectively incrementing the variables w and t by 1 when it has not been completely processed and then returning to the step 1-3.

2. The method as claimed in claim 1, wherein the step 1-1 comprises the steps of:

for each codeword $c_i$ constructing the codebook, selecting two codewords $c_j$ and $c_{j'}$ that are closest in distance among codewords and satisfy a condition of $SED(c_i, c_j) \leq SED(c_i, c_{j'})$ ($SED(x,y)$ is the square of Euclidean distortion between x and y);

comparing a predetermined distance value between vectors, D, with the calculated $SED(c_i, c_j)$ and $SED(c_i, c_{j'})$;

arbitrarily allocating $c_i$ to $G_0$ or $G_1$ and selecting one of $c_j$ and $c_{j'}$ to allocate it to the opposite group $G_1$ or $G_0$ when both of $SED(c_i, c_j)$ and $SED(c_1, c_j')$ are less than D, arbitrarily allocating $c_i$ to $G_0$ or $G_1$, and selecting $c_j$ to allocate it to the opposite group $G_1$, or $G_0$ when $SED(c_i, c_j) \leq D$ and $SED(c_i, c_{j'}) > D$;

arbitrarily allocating $c_i$ to $G_0$ or $G_1$, and selecting $c_{j'}$ to allocate it to the opposite group $G_1$ or $G_0$ when $SED(c_i, c_j) > D$ and $SED(c_i, c_{j'})D$; and allocating $c_i$ to $G_{-1}$ when both of $SED(c_i, c_j)$ and $SED(c_i, c_{j'})$ are more than D.

3. The method as claimed in claim 2, wherein the codebook is generated through a step of applying Lloyd algorithm to a set of input vectors for learning to generate a codebook having m/2 codewords, and a step of setting the generated codebook as the initial value of Lloyd algorithm and applying Lloyd algorithm to the set of input vectors for learning to finally generate the codebook composed of m codewords.

4. A method for inserting watermark information according to claim 1, wherein said method is performed with a computer readable medium storing a computer program.

5. A method for inserting watermark information according to claim 2, wherein said method is performed with a computer readable medium storing a computer program.

6. A method for inserting watermark information according to claim 3, wherein said method is performed with a computer readable medium storing a computer program.

7. A method for extracting a watermark from a vector-quantized image watermarked according to the watermark insertion method claimed in claim 1, comprising:

a step 2-11 of initializing a variable n;

a step 2-12 of extracting a codeword $c_n$ from an image block into which watermark information has been inserted;

a step 2-13 of confirming the group $G_p$ including the extracted codeword $c_n$, ignoring the codeword $c_n$ when P is −1, and changing the codeword $c_n$ into a bit value to add it to the extracted watermark information when P is 0 or 1; and a step 2-14 of incrementing the variable n by 1 until extraction of the watermark is finished and repeating the steps 2-12 and 2-13.

8. A method for extracting a watermark according to claim 7, wherein said method is performed with a computer readable medium storing a computer program.

9. A method for extracting a watermark from a vector-quantized image watermarked according to the watermark insertion method claimed in claim 2, comprising:

a step 2-21 of initializing a variable n;

a step 2-22 of extracting a codeword $c_n$ from an image block into which watermark information has been inserted;

a step 2-23 of confirming the group $G_p$ including the extracted codeword $c_n$, ignoring the codeword $c_n$ when P is −1, and changing the codeword $c_n$ into a bit value to add it to the extracted watermark information when P is 0 or 1; and a step 2-24 of incrementing the variable n by 1 until extraction of the watermark is finished and repeating the steps 2-22 and 2-23.

10. A method for extracting a watermark according to claim 9, wherein said method is performed with a computer readable medium storing a computer program.

11. A method for extracting a watermark from a vector-quantized image watermarked according to the watermark insertion method claimed in claim 3, comprising:

a step 2-31 of initializing a variable n;

a step 2-32 of extracting a codeword $c_n$ from an image block into which watermark information has been inserted;

a step 2-33 of confirming the group $G_p$ including the extracted codeword $c_n$, ignoring the codeword $c_n$ when P is −1, and changing the codeword $c_n$ into a bit value to add it to the extracted watermark information when P is 0 or 1; and a step 2-34 of incrementing the variable n by 1 until extraction of the watermark is finished and repeating the steps 2-32 and 2-33.

12. A method for extracting a watermark according to claim 11, wherein said method is performed with a computer readable medium storing a computer program.

* * * * *